(12) United States Patent
Thackara

(10) Patent No.: US 7,079,724 B2
(45) Date of Patent: Jul. 18, 2006

(54) LIQUID CRYSTAL THERMO-OPTIC SWITCH AND ELEMENT

(76) Inventor: John Ingalls Thackara, 655 S. Fairoaks Ave., D-317, Sunnyvale, CA (US) 94086

( * ) Notice: Subject to any disclaimer, the term of this patent is extended or adjusted under 35 U.S.C. 154(b) by 215 days.

(21) Appl. No.: 10/718,668

(22) Filed: Nov. 24, 2003

(65) Prior Publication Data
US 2005/0111783 A1    May 26, 2005

(51) Int. Cl.
*G02B 6/35*    (2006.01)
*G02B 6/26*    (2006.01)

(52) U.S. Cl. .......................... 385/16; 385/45
(58) Field of Classification Search ............ 385/16–24, 385/45
See application file for complete search history.

(56) References Cited

U.S. PATENT DOCUMENTS

| | | | |
|---|---|---|---|
| 4,070,092 A | 1/1978 | Burns | |
| 4,775,207 A | 10/1988 | Silberberg | |
| 4,828,362 A | 5/1989 | Skinner et al. | |
| 6,084,050 A | 7/2000 | Ooba et al. | |
| 6,311,004 B1 | 10/2001 | Kenney et al. | |
| 6,546,163 B1 | 4/2003 | Thackara | |
| 2002/0076142 A1* | 6/2002 | Song | 385/22 |

OTHER PUBLICATIONS

"Guided Wave devices for Optical Communication", R.C. Alferness, IEEE J. Quantum Electron., vol. QE-17, (1981), pp. 946-958.

"Silica Waveguide Thermooptic Phase Shifter with Low Power Consumption and Low Lateral Heat Diffusion", B.A. Moller et al., IEEE Photonics Technol. Lett., vol. 5, (1993) pp. 1415-1418.

"2×2 Optical Waveguide Matrix Switch Using Nematic Liquid Crystal", M. Kobayashi et al., IEEE J. Quantum Electron., vol. QE-18, (1982) pp. 1603-1610.

(Continued)

*Primary Examiner*—Michelle Connelly-Cushwa
(74) *Attorney, Agent, or Firm*—Buchanan Ingersoll LLP

(57) ABSTRACT

A channel waveguide switch, driven by liquid crystal thermo-optic elements, suitable for use in integrated optic applications. Two trenches, one on either side and parallel with the core region of a channel waveguide Y-branch, are filled with a liquid crystal material possessing positive birefringence. When a given trench is held at a temperature a few degrees below the clearing point, the liquid crystal is in its nematic phase with its director aligned along the long direction of the trench so that both polarizations of the guided mode are loaded by the liquid crystal's ordinary refractive index. When the trench is held at a temperature a few degrees above the clearing point, both polarizations of the optical mode are loaded by the liquid crystal's isotropic index. By holding the temperature of the second trench at the alternate temperature, the differential loading on the Y-branch causes the guided mode to be switched into the path loaded by the liquid crystal's isotropic index. By controlling the liquid crystal temperature(s) at more than one location along the trench(s), the switch can be configured to operate as a variable attenuator.

33 Claims, 8 Drawing Sheets

OTHER PUBLICATIONS

"Optics of Liquid Crystal Displays", P. Yeh et al., A Wiley Interscience Publication, John Wiley & Sons, Inc., (1999) pp. 5-13 & 59.

"Liquid-crystal fiber-optic switch", R.A. Soref, Optics Letters, Optical Society of America, vol. 4 No. 5, (1979) pp. 155-157.

"SiO Evaporated Films Topography and Nematic Liquid Crystal Orientation", M. Monkade et al., J. Phys. II France 7 (1997), pp. 1577-1597.

"Flame Hydrolysis Deposition of Glass on Silicon for the Integration of Optical and Microfluidic Devices", J.M. Ruano et al., Anal. Chem. 2000, 72, (2000), pp. 1093-1097.

\* cited by examiner

LIQUID CRYSTAL THERMO-OPTIC SWITCH AND ELEMENT

CROSS-REFERENCE TO RELATE APPLICATIONS

This application claims priority to U.S. Provisional Patent Application No. 60/451,335, filed Feb. 27, 2003, which is incorporated herein by reference in its entirety.

STATEMENT REGARDING FEDERALLY SPONSORED RESEARCH OR DEVELOPMENT (Not Applicable)

REFERENCE TO "SEQENCE LISTING," A TABLE, OR COMPUTER PROGRAM LISTING APPENDIX SUBMITTED ON A COMPACT DISC (Not Applicable)

BACKGROUND OF THE INVENTION

1. Field of the Invention

The present invention relates generally to optical switches of the integrated optic type, and more particularly to a liquid crystal based thermo-optic switch capable of redirecting optical beams of arbitrary polarization state in a channel waveguide geometry. Additionally, the invention relates to an integrated optic variable attenuator based on this switch architecture.

2. Description of the Related Art

Currently, a typical integrated optic switch employs either electro-optic [see for example R. C. Alferness, "Guided Wave Devices for Optical Communication", IEEE J. Quantum Electron., vol. QE-17, pp. 946–958 (1981); U.S. Pat. Nos. 4,070,092 and 4,775,207] or thermo-optic [see for example B. A. Moller, L. Jensen, C. Laurent-Lund, and C. Thirstrup, "Silica Waveguide Thermo-Optic Phase Shifter with Low Power Consumption and Low Lateral Heat Diffusion", IEEE Photonics Technol. Lett., vol. 5, pp. 1415–1418 (1993); U.S. Pat. Nos. 6,084,050 and 6,311,004] effects to produce differential refractive index loading between two optical pathways within the switch which in turn directs the guided optical mode into a particular output pathway, usually the higher loaded pathway. The refractive index loading produced by electro-optic effects is inherently birefringent in that these materials load the two polarization states of the guided mode(s) differently which complicates the switch design. Thermo-optic loading can be polarization independent but the magnitude of the effect in currently available thermo-optic materials is limited requiring high differential temperatures to induce complete switching. Liquid crystal based optical switches [see for example R. A. Soref, "Liquid-Crystal Fiber-Optic Switch", Opt. Lett., vol. 4, pp. 155–157 (1979); M. Kobayashi et al., "2×2 Optical Waveguide Matrix Switch Using Nematic Liquid Crystal", IEEE J. Quantum Electron., vol. QE-18, pp. 1603–1610 (1982); U.S. Pat. No. 4,828,362] benefit from the large refractive index loading provided by the liquid crystal reorientation but are also sensitive to the polarization state of the optical radiation being switched. Due to these limitations, current integrated optic switches can be difficult to implement.

BRIEF SUMMARY OF THE INVENTION

According to one aspect of the invention, an integrated optic switch is provided, the switch including an optical Y-branch waveguide structure capable of guiding at least one optical mode. The structure includes a cladding medium, a channel waveguide core disposed in said cladding medium and containing an input branch and first and second output branches, a first liquid crystal material, and first temperature control element in heat exchange relationship with the first liquid material. The first liquid crystal material is associated with the first output branch and has ordinary and isotropic refractive indices corresponding to nematic and isotropic phases of the liquid crystal material, respectively. The first temperature control element selectively adds heat to the first liquid crystal material to thereby change the phase thereof from nematic to isotropic, said change producing differential refractive index loading of the optical Y-branch waveguide such that at least a portion of optical mode light directed into one of the first and second output branches is redirected into the other of the first and second output branches.

According to a further aspect of the invention, a variable optic attenuator is provided, including a cladding medium, a channel waveguide core disposed in said cladding medium and capable of guiding at least one optical mode, the channel waveguide core containing at least one input branch and at least first and second output branches, a first liquid crystal material associated with the first output branch and having ordinary and isotropic refractive indices corresponding to nematic and isotropic phases of the liquid crystal material, respectively, and one or more temperature control elements disposed in heat exchange relationship with the first liquid crystal material, each temperature control element selectively adding heat to a corresponding portion of the first liquid crystal material to thereby change the phase thereof from nematic to isotropic, the change producing differential refractive index loading of the channel waveguide core such that at least a portion of optical mode light directed into one of the first and second output branches is redirected into the other of the first and second output branches.

According to a further aspect of the invention, a liquid crystal thermo-optic element capable of being held in either of two polarization independent refractive index states is provided. The element includes a solid medium capable of transmitting optical radiation propagating along a given direction, and a liquid crystal material having ordinary and isotropic refractive indices corresponding, respectively, to nematic and isotropic phases, wherein, in the nematic phase, a first index of refraction is presented to optical radiation in the solid medium, and in the isotropic phase, a second index of refraction is presented to optical radiation in the solid medium. The element further includes a temperature control element disposed in heat exchange relationship with the liquid crystal material, the temperature control element selectively causing switching in the liquid crystal material between one and the other of the nematic and isotropic phases.

According to a further aspect of the invention, a method is provided for selectively directing light in an input branch of an optical structure into one or more of multiple output branches, at least one of said output branches having associated therewith a liquid crystal material having ordinary and isotropic refractive indices corresponding, respectively, to nematic and isotropic phases, the liquid crystal material having a temperature control element in heat exchange relationship therewith. The method includes launching light into the optical structure, and using the temperature control element to change the phase of the liquid crystal material from one to the other of the nematic and isotropic phases, thereby causing at least a portion of the light launched into the optical structure to be redirected from one output branch into another.

In accordance with an aspect of the invention, the liquid crystal material is chosen to have positive birefringence so that its ordinary refractive index, when the material is in its nematic phase, is less than its isotropic refractive index. For the switch to operate, the two trenches are held at different temperatures: one trench is held at a temperature a few degrees below the liquid crystal clearing temperature and the other trench is held at a temperature a few degrees above the clearing temperature. When a given trench is held at the lower temperature, the liquid crystal is in its nematic phase with its director aligned along the long direction of the trench so that both polarizations of the guided mode are loaded by the liquid crystal's ordinary refractive index. When the other trench is held at the higher temperature, the liquid crystal is in its isotropic phase and therefore both polarizations of the optical mode experience an increased level of loading due to the liquid crystal's isotropic index. The lengths of the trenches and their proximity to the channel waveguide core are chosen so that the differential refractive index loading on the Y-branch is sufficient to cause the guided mode to be completely switched into the path loaded by the liquid crystal's isotropic index. Since the differential loading on the Y-branch produced by this combination of liquid crystal nematic orientation and choice of liquid crystal phases employed is polarization independent, the switch is polarization independent.

Also according to this invention, a variable optical attenuator is formed by providing means to control the temperature within one or both of the trenches over a plurality of sections. The length of each trench section is chosen to be a fraction of that needed to produce complete switching. By creating differential loading of the channel waveguide Y-branch at only a subset of the sections, only a portion of the guided mode is switched. One of the two output paths from the switch can therefore be used to provide the attenuated beam while the second path provides the compliment beam.

BRIEF DESCRIPTION OF THE SEVERAL VIEWS OF THE DRAWINGS

Many advantages of the present invention will be apparent to those skilled in the art with a reading of this specification in conjunction with the attached drawings, wherein like reference numerals are applied to like elements, and wherein.

DETAILED DESCRIPTION OF THE INVENTION

Figure 1:
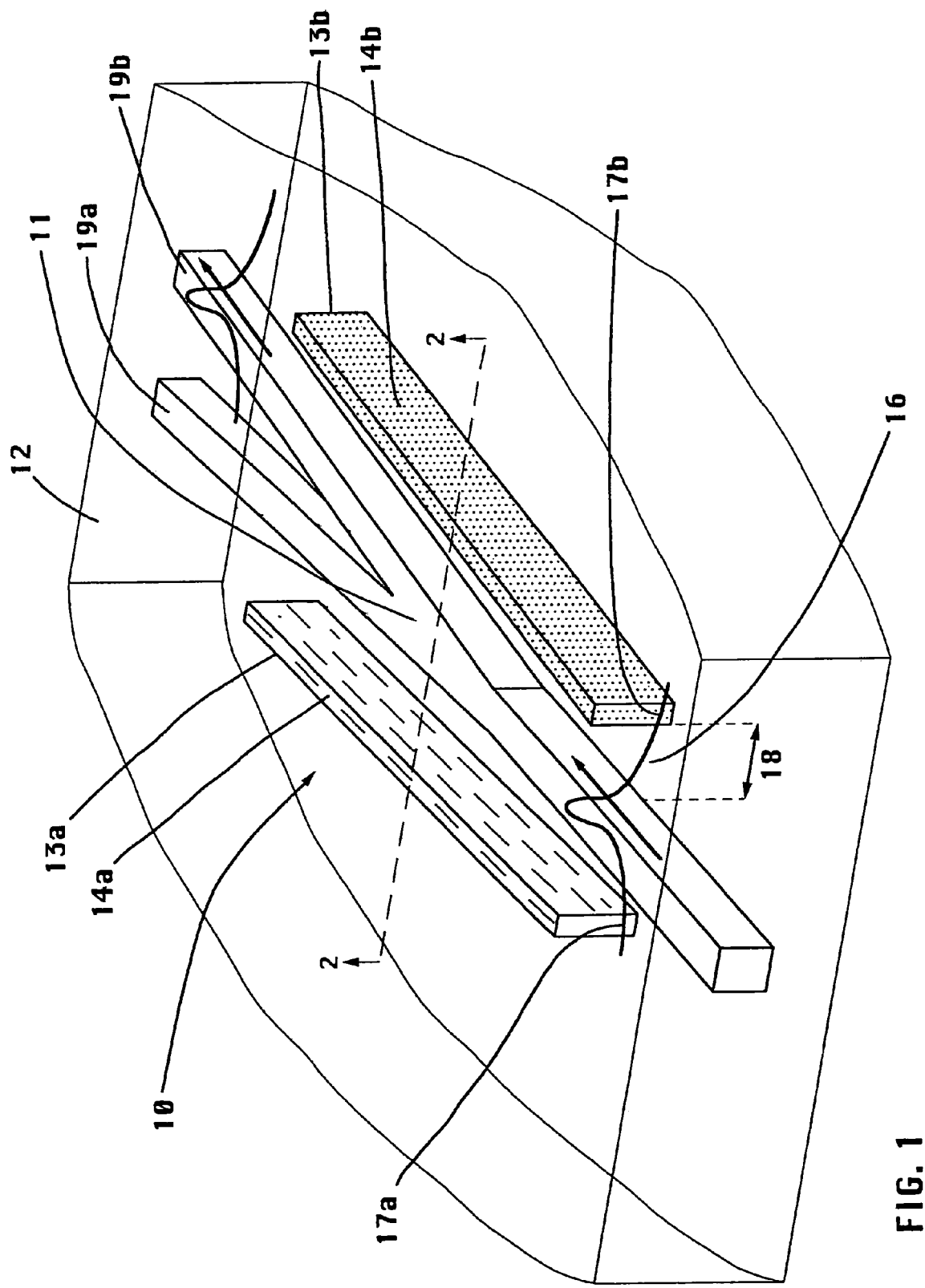
FIG. 1 is a perspective view illustrating a liquid crystal thermo-optic integrated optic switch in accordance with the present invention showing a channel waveguide Y-branch, two liquid crystal filled trenches, and propagation directions of input and output optical modes for a case in which it is the lower trench that is held above the liquid crystal clearing temperature.
Figure 2:
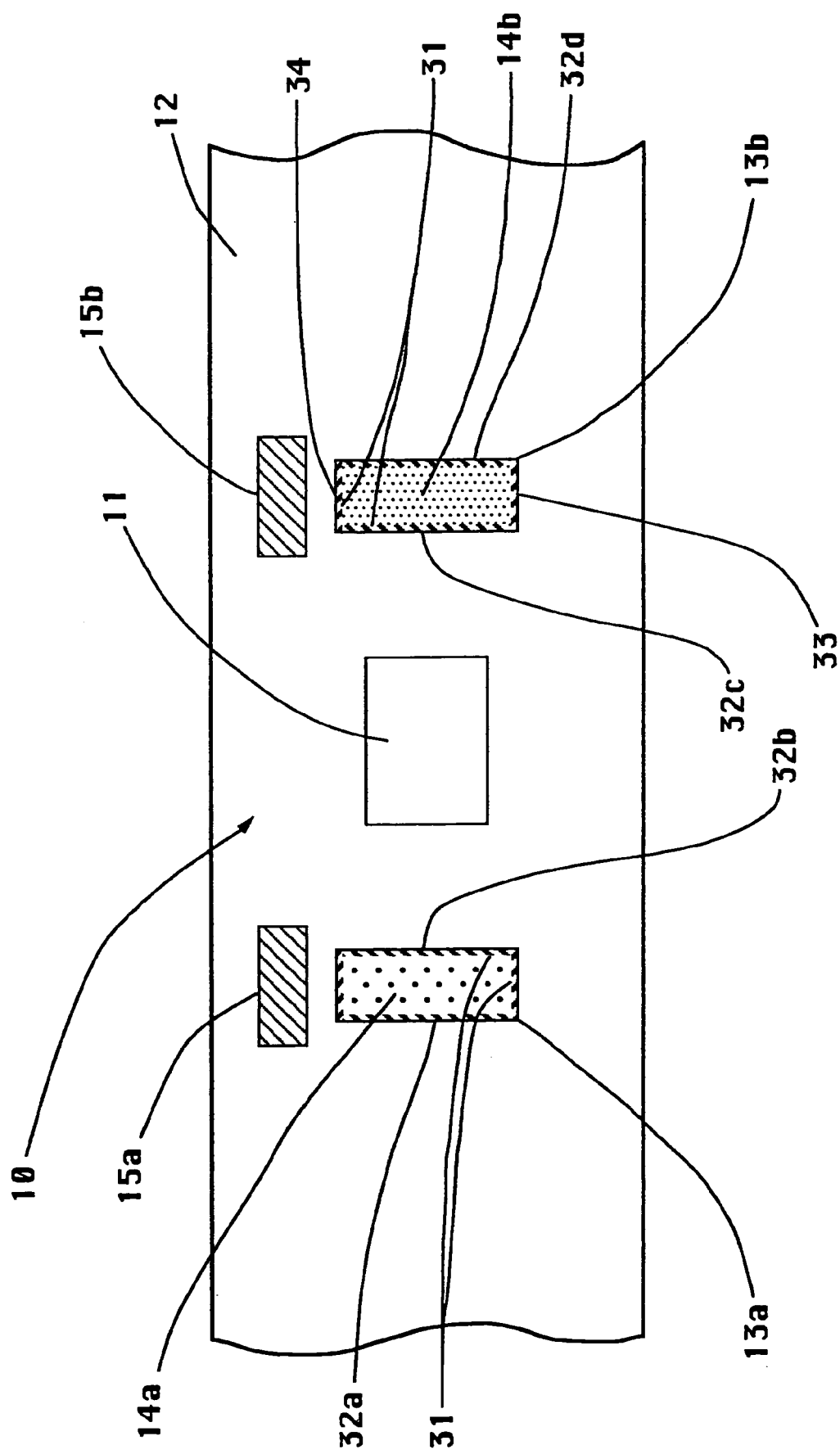
FIG. 2 is a cross-sectional view of a liquid crystal thermo-optic integrated optic switch taken along the line 2—2 of FIG. 1 and showing the channel waveguide structure including the Y-branch core and the two liquid crystal filled trenches, and the two temperature control elements.

A perspective view of the liquid crystal thermo-optic switch 10 is shown in FIG. 1. For clarity, a cross-sectional view of the thermo-optic switch taken along the line 2—2 in FIG. 1 is shown in FIG. 2. The switch is comprised of a channel waveguide Y-branch 11 embedded within a surrounding cladding medium 12, two trenches 13 filled with a liquid crystal material 14, and two temperature control elements 15 (see FIG. 2). Each temperature control element 15 maintains the temperature of the liquid crystal material 14 in its associated trench 13 at one of two temperatures, one temperature a few degrees above the liquid crystal material's clearing temperature and the alternate temperature a few degrees below the clearing temperature. When the liquid crystal material 14 in a given trench 13 is held at the lower temperature, the liquid crystal material 14 is well into its nematic phase. When in the nematic phase, the nematic director within the volume of the liquid crystal 14 is made to align with the long dimension of the trench 13 by steric and/or surface alignment forces at the inner surfaces of the trench 13. In FIG. 1, the liquid crystal material 14a in the upper trench 13a is depicted as being in its nematic phase. Since the trenches 13 are substantially parallel to the propagation direction of the optical mode(s) 16 guided within the Y-branch 11, the portion of the evanescent field of the mode(s) 17a that reaches the nematic liquid crystal material 14a propagates along the nematic director so that both polarizations of the evanescent field 17a encounter the same ordinary refractive index of the liquid crystal material 14a. When the liquid crystal material 14 in a given trench 13 is held at the higher temperature, the liquid crystal material 14 is well into its isotropic phase. In FIG. 1, the liquid crystal material 14b in the lower trench 13b is depicted as being in its isotropic phase. Since the isotropic index is polarization independent, both polarizations of the portion of the evanescent field of the mode(s) 17b that reach the isotropic liquid crystal material 14b within the lower trench 13b encounter the same isotropic refractive index of the liquid crystal material 14b.

The liquid crystal material 14 is chosen to have positive birefringence so that the isotropic refractive index is higher than the ordinary refractive index. Moreover, the Y-branch 11 and liquid crystal materials 14 are also chosen so that the liquid crystal material's 14 isotropic refractive index is lower than the Y-branch material's 11 refractive index. This choice of indices allows the effective index of the Y-branch 11 to be loaded by the refractive indices of the liquid crystal filled trenches 13 when the liquid crystal material 14 is in either the nematic or isotropic phase without causing the guided mode 16 to radiate from the Y-branch 11. The refractive index loading of the Y-branch 11 is higher when the liquid crystal material 14 is in its isotropic (higher index) phase than when the liquid crystal material 14 is in its nematic (lower index) phase.

The switch is operated by holding the liquid crystal material 14a/b in one trench 13a/b at the lower temperature while holding the liquid crystal material 14b/a in the other trench 13b/a at the higher temperature so as to produce differential refractive index loading of the Y-branch 11. The length of the trenches 13, as well as the lateral distance 18 between the trenches 13 and the Y-branch 11, are chosen in conjunction with the individual levels of refractive index loading to provide a sufficient differential loading of the Y-branch 11 to direct the guided mode 16 into the output arm 19b/a of the Y-branch 11 that is adjacent to the trench 13b/a containing the isotropic liquid crystal material 14b/a.

As shown in FIG. 2, when held at the lower operating temperature by a temperature control element 15, the nematic liquid crystal material 14 can be aligned within the trench 13 through the use of alignment coatings 31 deposited on the trench walls 32, or on the trench floor 33, or on the trench ceiling 34, or on a combination of these surfaces. The alignment coatings 31 can be deposited, for example, by the oblique evaporation of SiO, M. Monkade, Ph. Martinot-Lagarde, G. Durand, and C. Granjean, "SiO Evaporated Films Topography and Nematic Liquid Crystal Orientation", J. Phys. II France, vol. 7, pp. 1577–1596 (1997). For the case in which just the trench walls 32a,b,c,d are coated, only two oblique evaporations are needed: one from the right to coat the left walls 32a,c and the other from the left to coat the right walls 32b,d. The aspect ratio of the trenches 13 is chosen to avoid shadow effects during the deposition of the alignment coatings 31. In FIG. 2, the liquid crystal material 14a in the left trench 13a is depicted as being in its nematic phase with the liquid crystal director aligned in the direction normal to the page. At the higher operating temperature, the alignment coatings have little or no effect on the liquid crystal material 14. In FIG. 2, the liquid crystal material 14b within the entire volume of the trench 13b is depicted as being in its isotropic phase.

Figure 3:
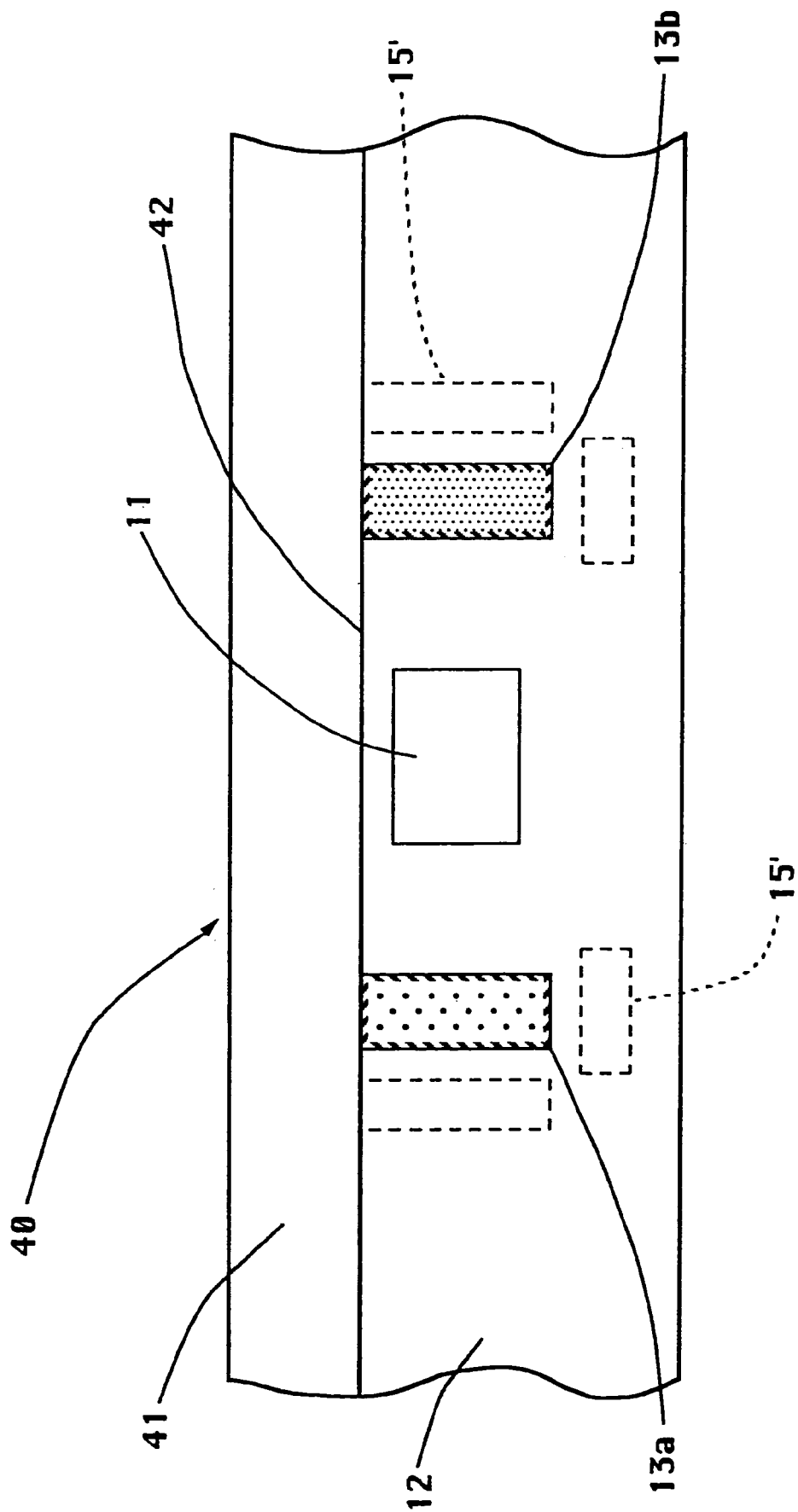
FIG. 3 is a cross-sectional view of an alternate liquid crystal thermo-optic integrated optic switch geometry showing alternate positions for the temperature control elements, and a superstrate that is bonded to the waveguide structure and which seals the liquid crystal filled trenches.

Although in the foregoing discussion the temperature control elements 15 were shown to be embedded within the cladding medium 12 and positioned on top of the trenches 13 (see FIG. 2), the temperature control elements 15 could be positioned at other locations in the proximity of the trenches 13. As shown in FIG. 3, the liquid crystal thermo-optic switch 40 could be configured with the temperature control elements positioned laterally from or below the trenches 13 as suggested by the dashed lines 15'. For such alternate temperature control element positions, a superstrate 41 could be bonded to the top surface of the switch 42 by, for example, a modified anodic bonding process, J. M. Ruano, V. Benoit, J. S. Aitchison, and J. M. Cooper, "Flame Hydrolysis Deposition of Glass on Silicon for the Integration of Optical and Microfluidic Devices", Anal. Chem., vol. 72, pp. 1093–1097 (2000). The superstrate 41 serves the dual function of providing a surface on which an alignment coating 31 could be deposited while also covering and sealing the trenches 13.

Whereas in the foregoing discussion the trenches 13 were filled with a liquid crystal material 14 having positive birefringence, the trenches 13 could alternatively be filled with a liquid crystal material having negative birefringence. In this case, the differential refractive index loading of the Y-branch 11 would result in the guided mode 16 being directed into the output arm 19a/b of the Y-branch 11 that is adjacent to the trench 13a/b containing the nematic liquid crystal material 14a/b.

Figure 4:
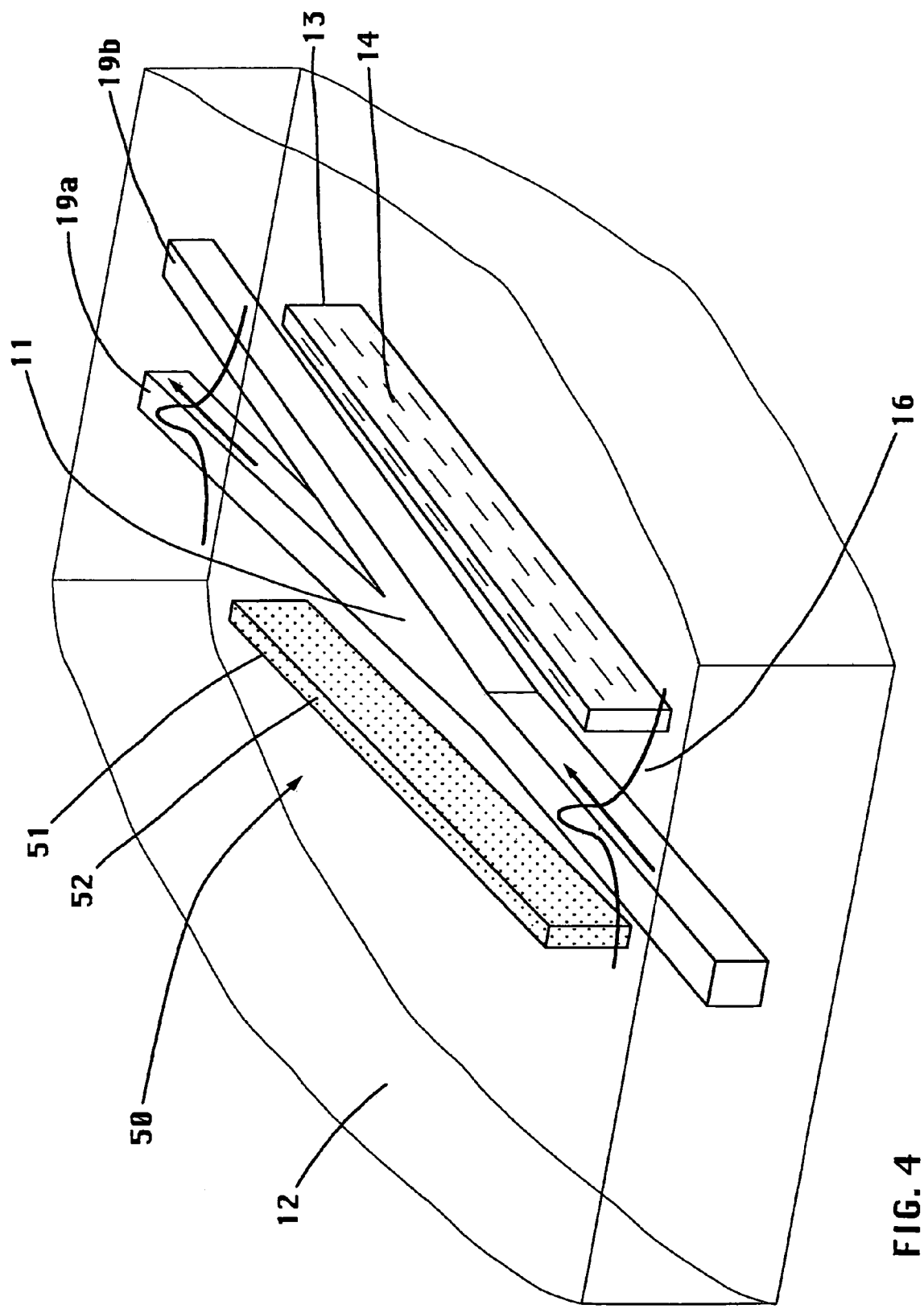
FIG. 4 is a perspective view of an alternate liquid crystal thermo-optic integrated optic switch architecture showing the channel waveguide Y-branch, a single liquid crystal filled trench, a second trench filled with a fixed index material, and the propagation directions of the input and output optical modes for the case in which the trench is held below the liquid crystal clearing temperature.

An alternate liquid crystal thermo-optic switch architecture 50 is shown in FIG. 4. In this alternate switch architecture 50, one of the trenches 51 is filled with a fixed index material 52. The refractive index of this material 52 is made to be higher than the liquid crystal material's 14 ordinary index but lower than its isotropic index. The differential refractive index loading of the Y-branch 11 can therefore be effected through the control of the temperature of just the single liquid crystal filled trench 13. Furthermore, this switch architecture 50 can be operated as a half-latch since the liquid crystal material 14 can be chosen so that it is in its nematic phase at ambient temperatures. In this case, when the liquid crystal filled trench 13 is at any temperature less than a few degrees below the clearing temperature, the guided mode 16 will remain switched into the output arm 19a that is adjacent to the trench 51 which contains the fixed index material 52. In FIG. 4, the liquid crystal material 14 in the lower trench 13 is depicted as being in its nematic phase so that the guided mode 16 is switched into the upper output arm 19a.

By employing a liquid crystal material 14 whose nematic and isotropic refractive indices straddle the refractive index of the cladding medium 12 but which are both still less than the refractive index of the Y-branch core 11, the alternate switch architecture 50 can be made even simpler: since the fixed index material 52 can then have the same index as the cladding medium 12, the trench 51 can be eliminated.

Figure 5:
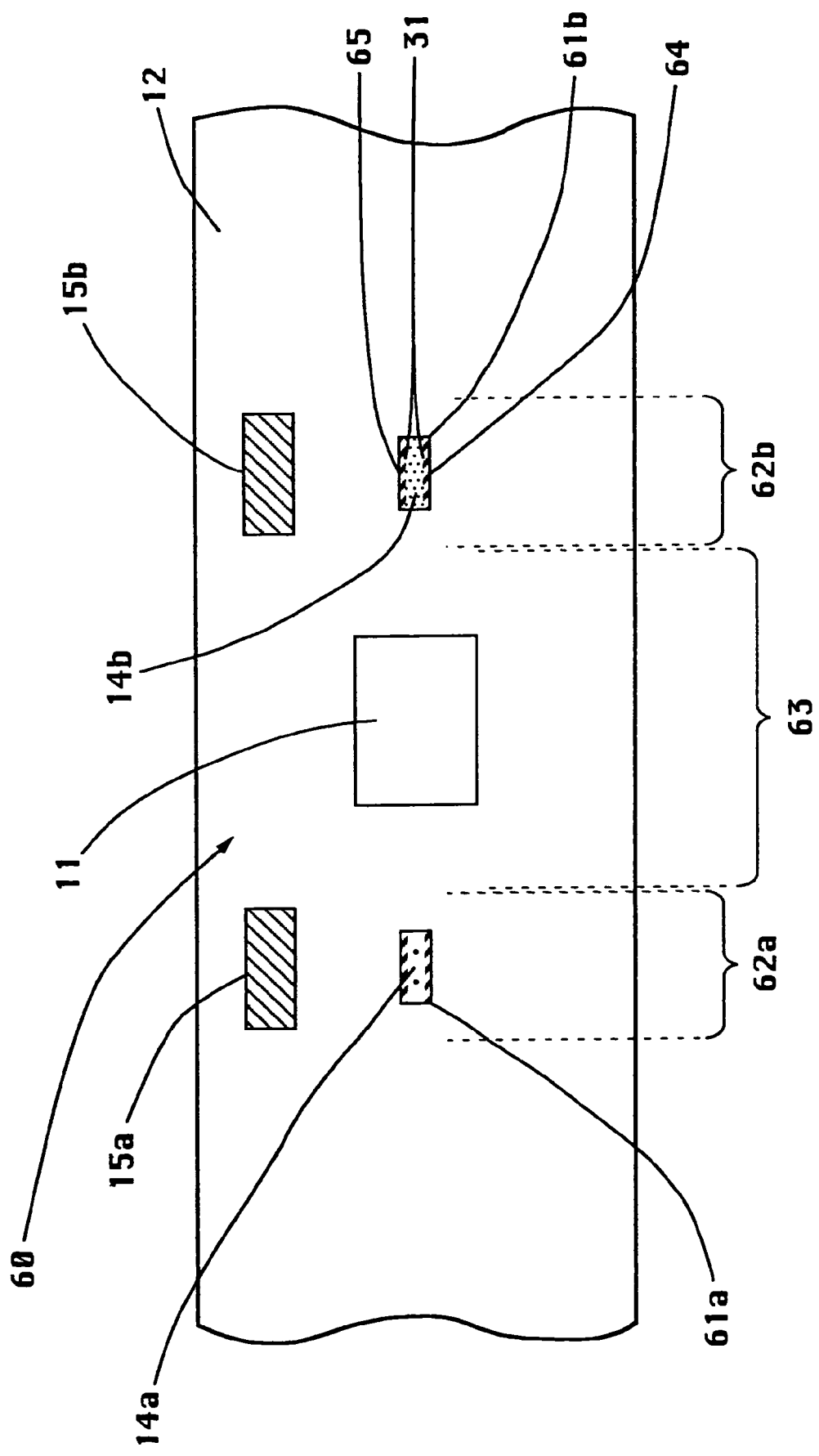
FIG. 5 is a cross-sectional view of another alternate liquid crystal thermo-optic integrated optic switch architecture showing the channel waveguide structure including the Y-branch core and two shallow liquid crystal filled trenches, and two temperature control elements.

Another alternate switch architecture 60 is shown in FIG. 5. In this switch architecture 60, the dimensions of the liquid crystal filled trenches 61 are made small enough so that even if either or both of the refractive indices of the liquid crystal material 14 is higher than that of the Y-branch core 11, the effective indices of the trench regions 62 will still be less than the effective index of the Y-branch 63 region. The refractive index loading of the Y-branch 11 can therefore still be accomplished without causing the guided mode 16 to radiate from the Y-branch 11 even if liquid crystal materials 14 with higher refractive indices than the Y-branch core 11 are employed. This alternate switch architecture 60 allows, for example, fused silica waveguides to be loaded by conventional liquid crystals such as E7™ (available from BDH, Ltd.). For the shallow trenches 61 shown in FIG. 5, alignment coatings 31 are best deposited on the trench floor 64 and/or on the trench ceiling 65.

Figure 6:
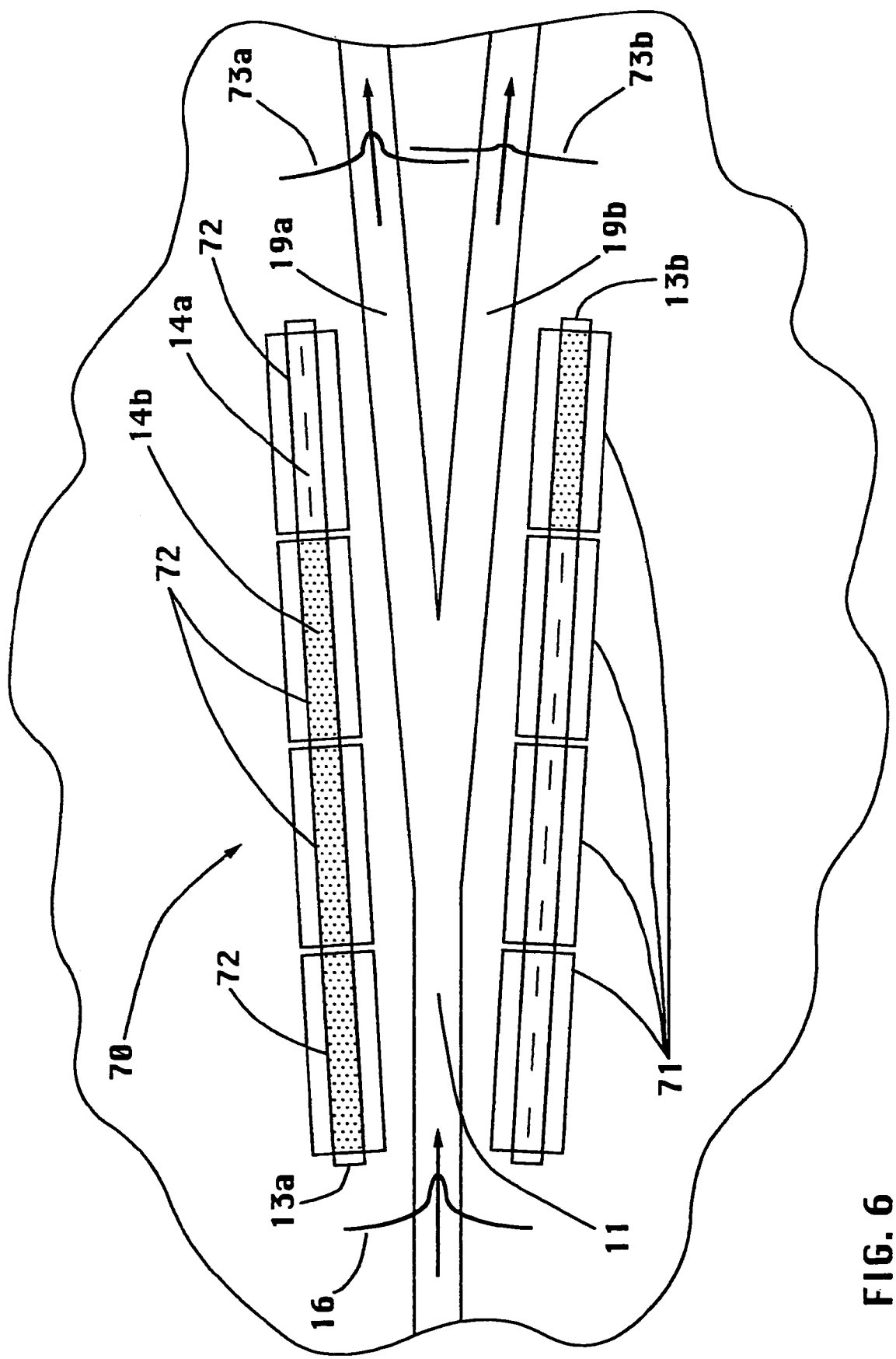
FIG. 6 is a top view of an alternate embodiment of the liquid crystal thermo-optic integrated optic switch in which the switch is configured to operate as a variable attenuator showing the channel waveguide Y-branch, the two liquid crystal filled trenches, the segmented temperature control elements, and the propagation directions of the input and two output optical modes for the case in which most of the sections of the upper trench are held above the clearing point while most of the sections of the lower trench are held below the clearing point.

An alternate embodiment of the liquid crystal thermo-optic switch in which the switch is configured to operate as a variable optical attenuator 70 is shown in top view in FIG. 6. This alternate switch 70 is similar to the liquid crystal thermo-optic switch 10 shown in FIGS. 1 and 2 with the exception that instead of controlling the temperature of each liquid crystal filled trench 13 with a single temperature control element 15 (see FIG. 2), a plurality of temperature control elements 71 are employed to hold the liquid crystal material 14 in individual sections 72 of each trench 13 in either the nematic or isotropic phase. When all sections in one trench 13a/b are held at the lower temperature while all sections of the other trench 13b/a are held at the higher temperature, the entire guided mode 16 is directed into output arm 19b/a of the Y-branch 11 that is adjacent to the trench 13b/a containing the isotropic liquid crystal material 14b/a. When some sections of the trenches 13 are held at the alternate temperature, the guided mode 16 is split into two output modes 73a,b. The splitting ratio is determined by how many and which sections of each trench 13 are held at the alternate temperature. One output arm 19b/a therefore carries the attenuated mode 73b/a while the other arm 19a/b carries the compliment mode 73a/b. In FIG. 6, three of the four sections 72 of the upper liquid crystal filled trench 13a are depicted as being held at the higher operating temperature while the reverse situation is depicted for the lower trench 13b so that most of the energy of the guided mode 16 is directed into the upper output arm 19a.

By choosing the number and proper lengths of the individual temperature control elements 71, relative to the total length of the trench 13, the amount of attenuation produced by a given temperature control element 71 can be given a desired weighting; such as binary for example (in other words ½, or ¼, or ⅛, etc.) relative to the total attenuation provided by the attenuator 70.

Figure 7:
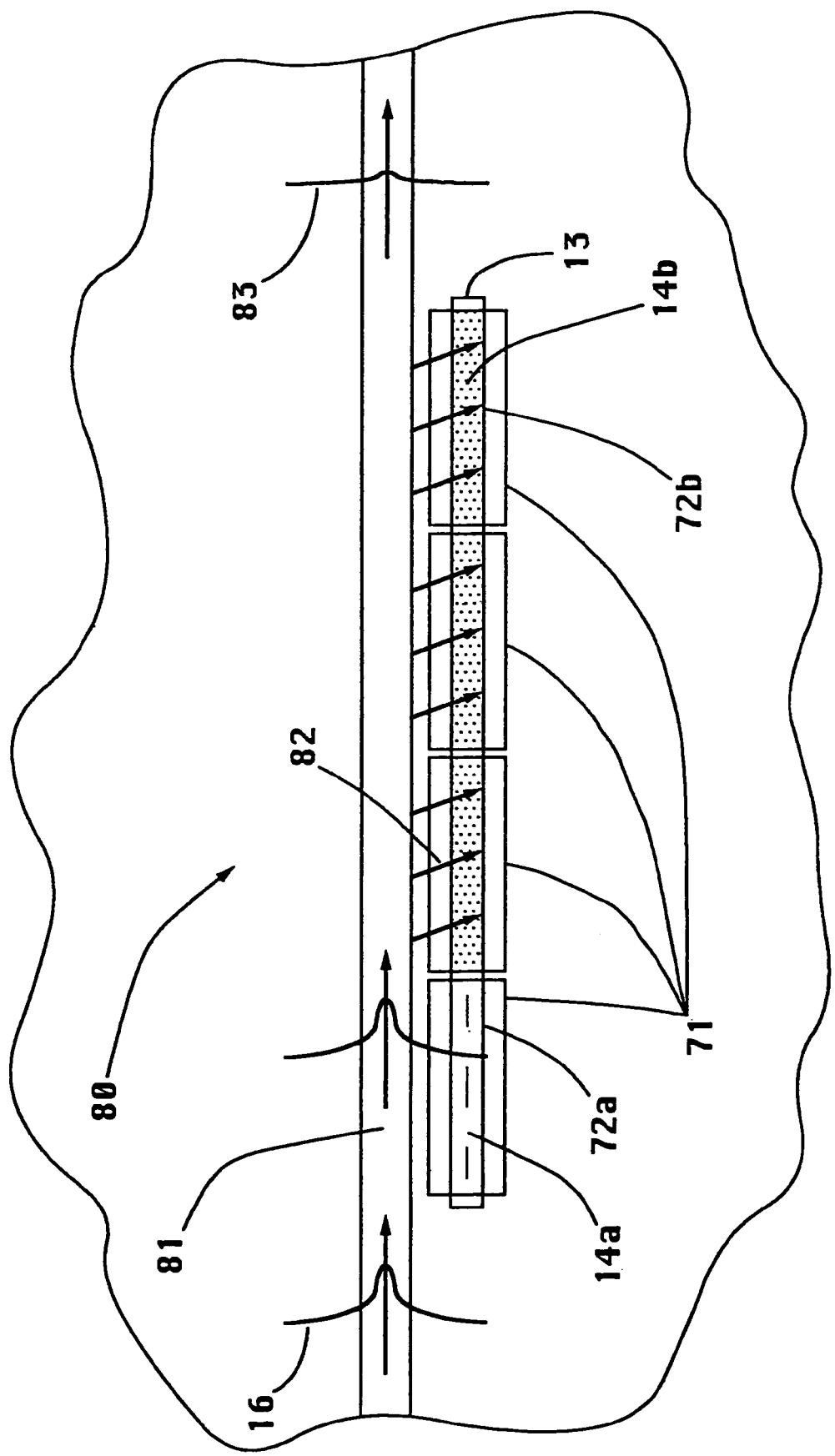
FIG. 7 is a top view of an alternate embodiment of the liquid crystal thermo-optic variable attenuator, showing the single channel waveguide, the single liquid crystal filled trench, the segmented temperature control elements, the input optical mode, the radiated optical energy, and the attenuated output optical mode for the case in which most of the sections of the trench are held above the clearing point.

An even simpler variable optical attenuator architecture 80 is shown in FIG. 7. In this simpler attenuator architecture 80, a single liquid crystal filled trench 13 of the same type as those used in switches 10, 40, and 50, and for which the temperature is controlled by a plurality of temperature control elements 71 of the same type as those used in the attenuator 70, is positioned in proximity with and parallel to a single waveguide core 81. The liquid crystal material 14 and the waveguide core material 81 are chosen so that the refractive index of the waveguide core material 81 is still higher than the liquid crystal material's 14 ordinary refractive index but is now less than the liquid crystal material's 14 isotropic index. When the guided mode 16 passes by a section 72a which is held at the lower operating temperature, both polarization states of the mode 16 remain guided since the liquid crystal material's 14a ordinary index is less than that of the core 81. However, when the mode 16 passes by a section 72b that is held at the higher operating temperature, portions of both polarization states of the mode 16 radiate from the waveguide core 81 into the liquid crystal material 14b since the isotropic index is higher than the refractive index of the core 81. Moreover, since both polarization states of the mode 16 experience the same isotropic index of the liquid crystal material 14b, the energy contained in the radiated optical beams 82 associated with each polarization state are substantially equal and so the amount of attenuation provided by the attenuator 80 is polarization independent. In FIG. 7, the last three segments 72 are depicted as being held at the higher operating temperature so that most of the mode's 16 energy is radiated from the waveguide core creating the strongly attenuated output mode 83.

Figure 8:
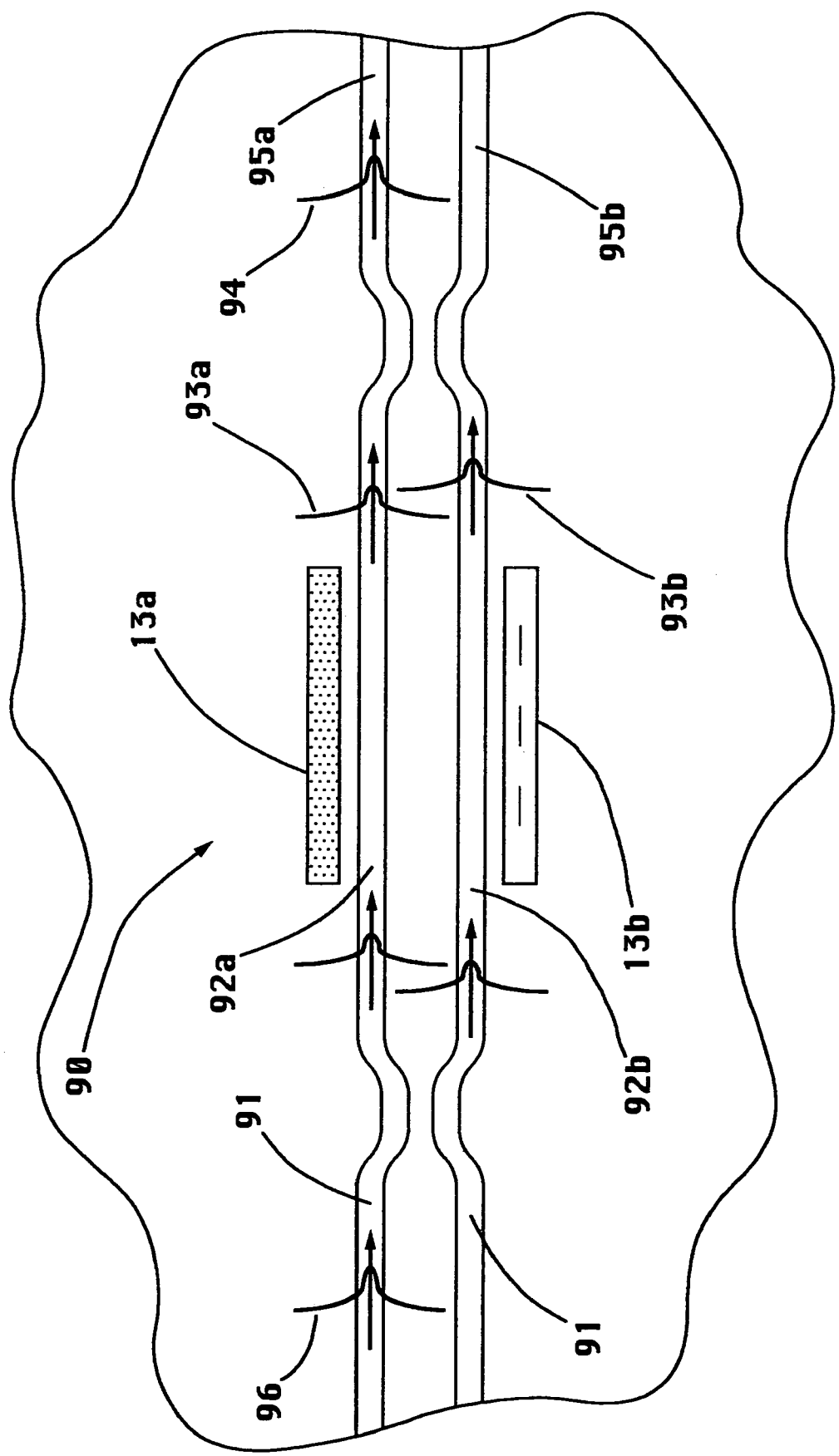
FIG. 8 is a top view illustrating an alternate liquid crystal thermo-optic integrated optic switch geometry showing the Mach-Zehnder waveguide structure, the two liquid crystal filled trenches, and the propagation directions of the input and output optical modes for the case in which the switch is in the cross state.

Still another alternate switch architecture 90 is shown in FIG. 8. In this switch architecture 90, a Mach-Zehnder geometry such as that described in R. C. Alferness, supra, is employed as the switch's 90 waveguide structure 91. When both liquid crystal filled trenches 13 are held at the same temperature, the switch 90 is in the cross state. To drive the switch 90 into the bar state, the two liquid crystal-filled trenches 13 are held at alternate operating temperatures in substantially the same way as is done for the Y-branch-based switch 10. The dimensions of the switch 90 are chosen so that in conjunction with the differential refractive index loading on the two center waveguides 92a,b produced by the liquid crystal-filled trenches 13a,b the differential optical phase shift imparted to the two guided modes 93a,b is sufficient to direct the recombined output mode 94 into the bar state arm 95a. In FIG. 8, the switch is depicted as being in the bar state in which the input mode 96 is directed into output arm 95a as a result of trenches 13a/b being held at the higher/lower operating temperatures.

As described above, this invention provides a liquid crystal based thermo-optic switch that is capable of efficiently redirecting optical beams of arbitrary polarization state in a channel waveguide geometry. This invention further provides a configuration for the liquid crystal thermo-optic channel waveguide switch which allows the switch to be operated as a variable attenuator. Moreover, this type of switch and the associated variable attenuator are suitable for routing and attenuating optical signals carried by single-mode optical fibers over wavelength ranges of interest to the telecommunications industry. This type of switch, as well as the liquid crystal thermo-optic trench elements on which it is based, are also suitable for integration with other silica-on-silicon devices to provide routing, shuttering or attenuation functionality.

The invention can be practiced with various types of materials. For the waveguide core material, the use of glass, doped with materials such as $GeO_2$, is contemplated for example. The cladding material can also exemplarily be of glass, with a lighter doping. Examples of the liquid crystal material are nematic type liquid crystals, which include, but are not limited to, E7, E5 and 5CB. For E7, the clearing temperature is 60.5 C, with suitable operating temperatures being about 53 C for the nematic phase and about 63 C for the isotropic phase. For E5, the clearing temperature is 50.5 C, with suitable operating temperatures being about 43 C and about 53 C for the nematic and isotropic phases, respectively. For 5CB, the clearing temperature is 35.3 C, with suitable operating temperatures being about 28 C and about 38 C for the nematic and isotropic phases, respectively. It will be appreciated that the particular combinations of materials selected would be dictated at least in part by the required refractive index relationships. Further, selection of glass for the waveguide material is preferred because of the good optical properties and chemical inertness which characterize this material. However, the use of polymeric materials, with proper channel sealing processes, may also be an option. For reference, the ordinary index of refraction of E7 liquid crystal material in the isotropic phase at 63 C is approximately 1.5350 for 1550 nm wavelength light. For that same light, the ordinary index of refraction of E7 liquid crystal material in the nematic phase at 53 C is approximately 1.5025.

The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. An integrated optic switch comprising:
   an optical Y-branch waveguide structure capable of guiding at least one optical mode and including:
   a cladding medium;
   a channel waveguide core disposed in said cladding medium and containing an input branch and first and second output branches;
   a first elongated trench formed in said cladding medium and filled with a first liquid crystal material and laterally spaced apart from said channel waveguide core, the longitudinal axis of said first trench being disposed along one side of said input branch and said first output branch opposite to said second output branch;
   said first liquid crystal material associated with the first output branch and having ordinary and isotropic refractive indices corresponding to nematic and isotropic phases of the first liquid crystal material, respectively; and
   a first temperature control element disposed in heat exchange relationship with the first liquid crystal material, the first temperature control element being operative to selectively add heat to the first liquid crystal material to change the phase thereof from nematic to isotropic, thereby producing differential refractive index loading of the channel waveguide core such that at least a portion of optical mode light directed into one of the first and second output branches is redirected into the other of the first and second output branches.

2. The switch of claim 1, wherein the first liquid crystal material is positively birefringent.

3. The switch of claim 1, wherein the first liquid crystal material is negatively birefringent.

4. The switch of claim 1, further including a second elongated trench formed in said cladding medium and filled with a second liquid crystal material and laterally spaced apart from said channel waveguide core, the longitudinal axis of said second trench being disposed along a side of said input branch and said second output branch opposite to said first output branch, said second liquid crystal material being associated with the second output branch.

5. The switch of claim 4, wherein the second liquid crystal material possesses a fixed refractive index lying between the ordinary and isotropic refractive indices of the first liquid crystal material.

6. The switch of claim 5, wherein the first liquid crystal material is in the nematic phase possessing the ordinary refractive index at ambient temperatures.

7. The switch of claim 4, wherein the second liquid crystal material has ordinary and isotropic refractive indices that correspond to nematic and isotropic phases of the second liquid crystal material, respectively, the switch further including a second temperature control element disposed in heat exchange relationship with the second liquid crystal material and operative to selectively add heat to the second liquid crystal material, thereby changing the phase of the second liquid crystal from nematic to isotropic.

8. The switch of claim 1, wherein the cladding medium has a refractive index lying between the ordinary and isotropic indices of the first liquid crystal material.

9. The switch of claim 1, wherein the refractive index of the channel waveguide core is higher than the ordinary refractive index of the first liquid crystal material and higher than the isotropic refractive index of the first liquid crystal material.

10. The switch of claim 1, wherein one of or both the isotropic and ordinary refractive indices of the first liquid crystal material are higher than the refractive index of the channel waveguide core.

11. The switch of claim 10, wherein said first elongated trench has a cross-section which is smaller than a cross section of the channel waveguide core.

12. The switch of claim 11, wherein the first elongated trench has a substantially rectangular cross sectional shape and includes first and second sides, a top and a bottom, at least one of the first side, second side, top and bottom being provided with an alignment coating.

13. The switch of claim 1, wherein said first elongated trench has a first side, a second side, a top and a bottom, at least one of said first side, second side, top and bottom including an alignment coating.

14. The switch of claim 13, wherein the alignment coating comprises SiO and is deposited by oblique evaporation.

15. A variable optic attenuator comprising:
    a cladding medium;
    a channel waveguide core disposed in said cladding medium and capable of guiding at least one optical mode, the channel waveguide core containing at least one input branch and at least first and second output branches;
    a first elongated trench formed in said cladding medium and filled with a first liquid crystal material and laterally spaced apart from said channel waveguide core, the longitudinal axis of said first trench being disposed along one side of said input branch and said first output branch opposite to said second output branch;
    said first liquid crystal material associated with the first output branch and having ordinary and isotropic refractive indices corresponding to nematic and isotropic phases of the first liquid crystal material, respectively; and
    one or more temperature control elements disposed in heat exchange relationship with the first liquid crystal material, each said temperature control element being operative to selectively add heat to a corresponding portion of the first liquid crystal material to change the phase thereof from nematic to isotropic, thereby producing differential refractive index loading of the channel waveguide core such that at least a portion of optical mode light directed into one of the first and second output branches is redirected into the other of the first and second output branches.

16. The variable optic attenuator of claim 15, wherein the first liquid crystal material is positively birefringent.

17. The variable optic attenuator of claim 15, wherein the first liquid crystal material is negatively birefringent.

18. The variable optic attenuator of claim 15, further including a second elongated trench formed in said cladding medium and filled with a second liquid crystal material and laterally spaced apart from said channel waveguide core, the longitudinal axis of said second trench being disposed alone a side of said input branch and said second output branch opposite to said first output branch, said second liquid crystal material being associated with the second output branch.

19. The variable optic attenuator of claim 18, wherein the second liquid crystal material possesses a fixed refractive index lying between the ordinary and isotropic refractive indices of the first liquid crystal material.

20. The variable optic attenuator of claim 19, wherein the first liquid crystal material is in the nematic phase possessing the ordinary refractive index at ambient temperatures.

21. The variable optic attenuator of claim 18, further including one or more temperature control elements disposed in heat exchange relationship with the second liquid crystal material and operative to selectively add heat to a corresponding portion of the second liquid crystal material to thereby change the phase thereof from nematic to isotropic.

22. The variable optic attenuator of claim 18, wherein each of said first and second trenches has a first side, a second side, a top and a bottom, at least one of said first side, second side, top and bottom including an alignment coating.

23. The variable optic attenuator of claim 22, wherein the alignment coatings comprise SiO deposited by oblique evaporation.

24. The variable optic attenuator of claim 15, wherein the cladding medium has a refractive index lying between the ordinary and isotropic indices of the first liquid crystal material.

25. The variable optic attenuator of claim 15, wherein the refractive index of the channel waveguide core is higher than the ordinary refractive index of the first liquid crystal material and higher than the isotropic refractive index of the first liquid crystal material.

26. The variable optic attenuator of claim 15, wherein one of or both the isotropic and ordinary refractive indices of the first liquid crystal material are higher than the refractive index of the channel waveguide core.

27. A liquid crystal thermo-optic element capable of being held in either of two polarization independent refractive index states, comprising:
   a solid medium capable of transmitting optical radiation propagating along a given direction;
   a liquid crystal material having ordinary and isotropic refractive indices corresponding, respectively, to nematic and isotropic phases, wherein, in the nematic phase, a first index of refraction is presented to optical radiation in the solid medium, and in the isotropic phase, a second index of refraction is presented to optical radiation in the solid medium and wherein said liquid crystal material is contained in at least one trench laterally spaced apart from said solid medium; and
   a temperature control element disposed in heat exchange relationship with the liquid crystal material, the temperature control element being operative to selectively cause switching in the liquid crystal material between the nematic and isotropic phases to produce differential refractive index loading to said solid medium.

28. The liquid crystal thermo-optic element of claim 27, wherein the liquid crystal material is positively birefringent.

29. The liquid crystal thermo-optic element of claim 27, wherein the liquid crystal material is negatively birefringent.

30. The liquid crystal thermo-optic element of claim 27, wherein the trench has walls, at least one of which is coated with an alignment coating.

31. The liquid crystal thermo-optic element of claim 30, wherein the alignment coating comprises SiO.

32. The liquid crystal thermo-optic element of claim 31, wherein the alignment coating is provided by oblique evaporation.

33. A method for selectively directing light in an input branch of an optical structure into one or more of multiple output branches of the optical structure, at least one of said output branches being associated with a liquid crystal material that is contained in at least one trench laterally spaced apart from the input and output branches and that has ordinary and isotropic refractive indices corresponding, respectively, to nematic and isotropic phases, the liquid crystal material having a temperature control element in heat exchange relationship therewith, the method comprising:
   launching light into the input branch of the optical structure; and
   using the temperature control element to change the phase of the liquid crystal material from one to the other of the nematic and isotropic phases such that differential refractive index loading is generated to the input and output branches, thereby causing at least a portion of the light launched into the input branch of the optical structure to be redirected from one output branch into another.

* * * * *